US010255074B2

(12) United States Patent
Kothinti Naresh et al.

(10) Patent No.: US 10,255,074 B2
(45) Date of Patent: Apr. 9, 2019

(54) SELECTIVE FLUSHING OF INSTRUCTIONS IN AN INSTRUCTION PIPELINE IN A PROCESSOR BACK TO AN EXECUTION-RESOLVED TARGET ADDRESS, IN RESPONSE TO A PRECISE INTERRUPT

(71) Applicant: QUALCOMM Incorporated, San Diego, CA (US)

(72) Inventors: Vignyan Reddy Kothinti Naresh, Morrisville, NC (US); Rami Mohammad Al Sheikh, Raleigh, NC (US); Harold Wade Cain, III, Raleigh, NC (US)

(73) Assignee: QUALCOMM Incorporated, San Diego, CA (US)

(*) Notice: Subject to any disclaimer, the term of this patent is extended or adjusted under 35 U.S.C. 154(b) by 466 days.

(21) Appl. No.: 14/851,238

(22) Filed: Sep. 11, 2015

(65) Prior Publication Data
US 2017/0075692 A1 Mar. 16, 2017

(51) Int. Cl.
G06F 9/30 (2018.01)
G06F 9/38 (2018.01)

(52) U.S. Cl.
CPC ........ G06F 9/3812 (2013.01); G06F 9/30021 (2013.01); G06F 9/3804 (2013.01); G06F 9/3861 (2013.01); G06F 9/3867 (2013.01)

(58) Field of Classification Search
None
See application file for complete search history.

(56) References Cited

U.S. PATENT DOCUMENTS 3,553,655 A 1/1971 Anderson et al.
6,256,728 B1 7/2001 Witt et al.
(Continued)

FOREIGN PATENT DOCUMENTS

EP 1347374 A2 9/2003

OTHER PUBLICATIONS

International Search Report and Written Opinion for PCT/US2018/049229, dated Nov. 17, 2016, 10 pages.
(Continued)

Primary Examiner — William B Partridge
(74) Attorney, Agent, or Firm — W&T/Qualcomm

(57) ABSTRACT

Selective flushing of instructions in an instruction pipeline in a processor back to an execution-determined target address in response to a precise interrupt is disclosed. A selective instruction pipeline flush controller determines if a precise interrupt has occurred for an executed instruction in the instruction pipeline. The selective instruction pipeline flush controller determines if an instruction at the correct resolved target address of the instruction that caused the precise interrupt is contained in the instruction pipeline. If so, the selective instruction pipeline flush controller can selectively flush instructions back to the instruction in the pipeline that contains the correct resolved target address to reduce the amount of new instruction fetching. In this manner, as an example, the performance penalty of precise interrupts can be lessened through less instruction refetching and reduced delay in instruction pipeline refilling when the instruction containing the correct target address is already contained in the pipeline.

30 Claims, 11 Drawing Sheets

(56) References Cited

U.S. PATENT DOCUMENTS

| 7,013,383 | B2 | 3/2006 | Shelor |
| 7,254,700 | B2 | 8/2007 | Levitan et al. |
| 7,624,254 | B2 | 11/2009 | Smith et al. |
| 8,099,586 | B2 | 1/2012 | Chou et al. |
| 2002/0019929 | A1 | 2/2002 | Kurata |
| 2005/0198479 | A1* | 9/2005 | Bean .................. G06F 9/30149 712/237 |
| 2005/0198481 | A1* | 9/2005 | Henry .................. G06F 9/3806 712/238 |
| 2005/0210224 | A1* | 9/2005 | Col ...................... G06F 9/3806 712/238 |
| 2010/0262807 | A1 | 10/2010 | Burky et al. |

OTHER PUBLICATIONS

Second Written Opinion for PCT/US2016/049229, dated Sep. 6, 2017, 5 pages.
International Preliminary Report on Patentability for PCT/US2016/049229, dated Dec. 18, 2017, 23 pages.

* cited by examiner

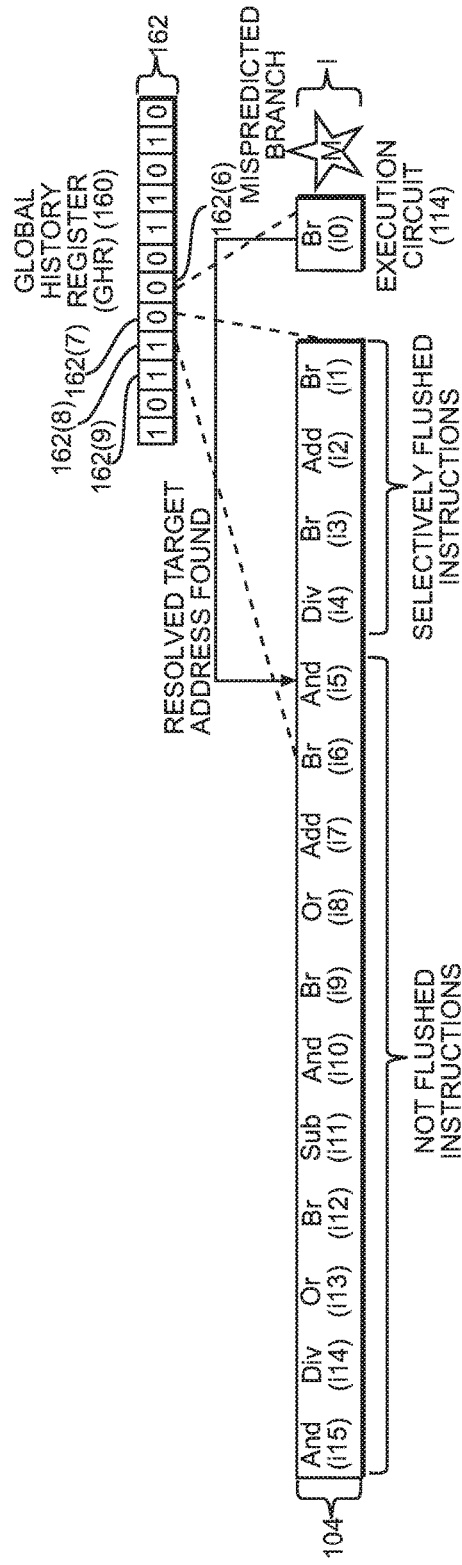
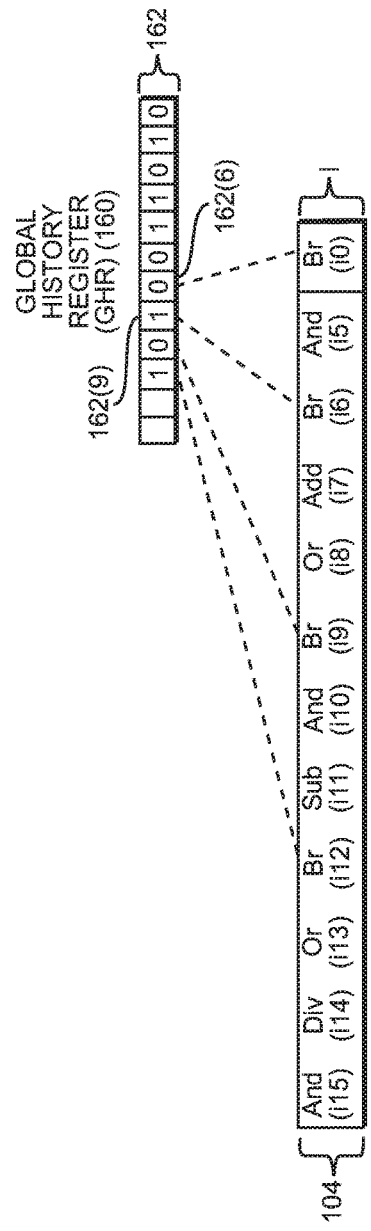
FIG. 7A
FIG. 7B

SELECTIVE FLUSHING OF INSTRUCTIONS IN AN INSTRUCTION PIPELINE IN A PROCESSOR BACK TO AN EXECUTION-RESOLVED TARGET ADDRESS, IN RESPONSE TO A PRECISE INTERRUPT

BACKGROUND

I. Field of the Disclosure

The technology of the disclosure relates generally to instruction pipelining in processors and more particularly to handling of hazards (e.g., branch mispredictions) in instruction pipelines when the next instruction cannot be executed.

II. Background

Instruction pipelining is a processing technique whereby the throughput of computer instructions being executed by a processor may be increased. In this regard, the handling of each instruction is split into a series of steps as opposed to each instruction being processed sequentially and fully executed before processing a next instruction. These steps are executed in an instruction pipeline composed of multiple stages. There are several cycles between the time an instruction is fetched from memory until the time the instruction is actually executed as the instruction flows through various pipeline stages of an instruction pipeline.

Optimal processor performance may be achieved if all stages in an execution pipeline are able to process instructions concurrently and sequentially as the instructions are ordered in the instruction pipeline(s). However, structural hazards can occur in an instruction pipeline where the next instruction cannot be executed without leading to incorrect computation results. For example, a control hazard may occur as a result of execution of a control flow instruction that causes a precise interrupt in the processor. One example of a control flow instruction that can cause a control hazard is a conditional branch instruction. In this regard, a branch direction prediction circuit can be provided in a processor to speculatively predict the outcome target address of a fetched conditional branch instruction. The processor can then speculatively fetch subsequent instructions in the fetch stages of an instruction pipeline following the fetch of a conditional branch instruction based on the prediction of a target address.

When the control flow instruction finally reaches the execution stage of the instruction pipeline and is executed, the outcome target address of the control flow instruction is verified by comparing it with the previously predicted target address when the control flow instruction was fetched. If the predicted and actual target addresses match, meaning a correct prediction, delay is not incurred in instruction execution, because the subsequent instructions at the target address will have been correctly fetched and already be present in the instruction pipeline when the conditional branch instruction reaches an execution stage of the instruction pipeline. However, if the predicted and actual target addresses do not match, a mispredicted branch hazard occurs in the instruction pipeline that causes a precise interrupt. As a result, the instruction pipeline is flushed and the instruction pipeline fetch unit is redirected to fetch new instructions starting from the target address, resulting in delay and reduced performance. Also, stages in the execution pipeline may remain dormant until the newly fetched instructions make their way through the instruction pipeline to the execution stage, thereby reducing performance.

While it may be desired to provide larger instruction pipelines in processors to allow for increased frequency scaling and performance as a result, the performance penalties incurred from structural hazards occurring in an instruction pipeline generally increase with the size of the pipeline. Generally the deeper the instruction pipeline, the longer it takes for an instruction to reach an execution stage for the structural hazard to be discovered. Also, a larger number of new instructions may need to be fetched after incurring the hazard because of the larger instruction pipeline size. Several solutions have been proposed to this problem. One such solution involves multi-path execute where multiple paths following a control flow instruction are fetched. However, multi-path execute is complicated due to the large number of possible execution paths that can occur during the time that a branch is outstanding. As subsequent branch instructions are encountered, each will incur another possibility of alternative execution paths, resulting in a tree of possible execution paths stemming from the original branch. The performance cost of fetching and buffering all of these paths in parallel is expensive.

Thus, it is desired to minimize the redirection penalty incurred with precise interrupts in a processor to minimize the effect on performance.

SUMMARY OF THE DISCLOSURE

Aspects disclosed herein include selective flushing of instructions in an instruction pipeline in a processor back to an execution-resolved target address, in response to a precise interrupt. The precise interrupt is generated in the processor as a result of a hazard occurring in instruction processing that would cause the execution of an instruction to result in an incorrect computational result. Examples of hazards that can cause precise interrupts are control hazards, such as branch mispredictions for example, structural hazards and data hazards. In this regard, in certain aspects disclosed herein, a selective instruction pipeline flush controller is provided in the processor. The selective instruction pipeline flush controller is configured to determine if a precise interrupt has occurred for an executed instruction in an execution stage of the instruction pipeline. The selective instruction pipeline flush controller determines if an instruction at the correct resolved target address of the instruction that caused the precise interrupt is contained in the instruction pipeline. If so, the selective instruction pipeline flush controller can selectively flush instructions back to the instruction in the instruction pipeline that contains the correct resolved target address to reduce the amount of new instruction fetching. This as opposed to all instructions located prior to the instruction that caused the precise interrupt being flushed. In this manner, as an example, the performance penalty of precise interrupts can be lessened through less instruction refetching and reduced delay in instruction pipeline refilling when the instruction containing the correct target address is already contained in the instruction pipeline.

In this regard, in one aspect, a selective instruction pipeline flush controller for a processor is provided. The selective instruction pipeline flush controller is configured to receive a precise interrupt comprising a resolved target address from an instruction processing system as a result of executing an instruction. The selective instruction pipeline flush controller is also configured to determine if an instruction at the resolved target address is present in an instruction pipeline in the instruction processing system. Responsive to determining that the instruction at the resolved target address is in the instruction pipeline, the selective instruction pipeline flush controller is also configured to selectively flush at least one instruction stored in the instruction pipeline back to a location of the instruction at the resolved target address stored in the instruction pipeline.

In another exemplary aspect, an apparatus for selective flushing of instructions in an instruction processing system in a processor is provided. The apparatus for selective flushing of instructions in the instruction processing system comprises means for receiving a precise interrupt comprising a resolved target address from the instruction processing system as a result of executing an instruction. The apparatus for selective flushing of instructions in the instruction processing system also comprises means for determining if an instruction at the resolved target address is present in an instruction pipeline in the instruction processing system. The apparatus for selective flushing of instructions in the instruction processing system also comprises means for selectively flushing at least one instruction stored in the instruction pipeline back to a location of the instruction at the resolved target address stored in the instruction pipeline, responsive to determining that the instruction at the resolved target address is in the instruction pipeline.

In another aspect, a method of selective flushing of an instruction pipeline in an instruction processing system in a processor is provided. The method comprises receiving a precise interrupt comprising a resolved target address from the instruction processing system as a result of executing an instruction. The method also comprises determining if an instruction at the resolved target address is present in the instruction pipeline in the instruction processing system. The method also comprises selectively flushing at least one instruction present in the instruction pipeline back to a location of the instruction at the resolved target address stored in the instruction pipeline if the instruction at the resolved target address is in the instruction pipeline.

In another aspect, an instruction processing system for a processor is provided. The instruction processing system comprises one or more instruction pipelines each comprising an instruction fetch circuit and an execution circuit. The instruction fetch circuit is configured to fetch instructions from an instruction memory into an instruction pipeline queue. The execution circuit is configured to execute the fetched instructions in the instruction pipeline queue. The instruction processing system also comprises a selective instruction pipeline flush controller. The selective instruction pipeline flush controller is configured to receive a precise interrupt comprising a resolved target address from the one or more instruction pipelines in the instruction processing system as a result of executing an instruction. The selective instruction pipeline flush controller is also configured to determine if an instruction at the resolved target address is present in an instruction pipeline in the one or more instruction pipelines in the instruction processing system. The selective instruction pipeline flush controller is also configured to, responsive to determining that the instruction at the resolved target address is in the instruction pipeline, selectively flush at least one instruction stored in the instruction pipeline back to a location of the instruction at the resolved target address stored in the instruction pipeline.

BRIEF DESCRIPTION OF THE FIGURES

FIGS. 7A and 7B are block diagrams illustrating an exemplary selective branch prediction state recovery for the instruction processing system in FIG. 1, wherein the branch prediction state that would have existed if an executed instruction that caused a precise interrupt had not been mispredicted, is recovered in response to a selective pipeline flush;

DETAILED DESCRIPTION

Figure 1:
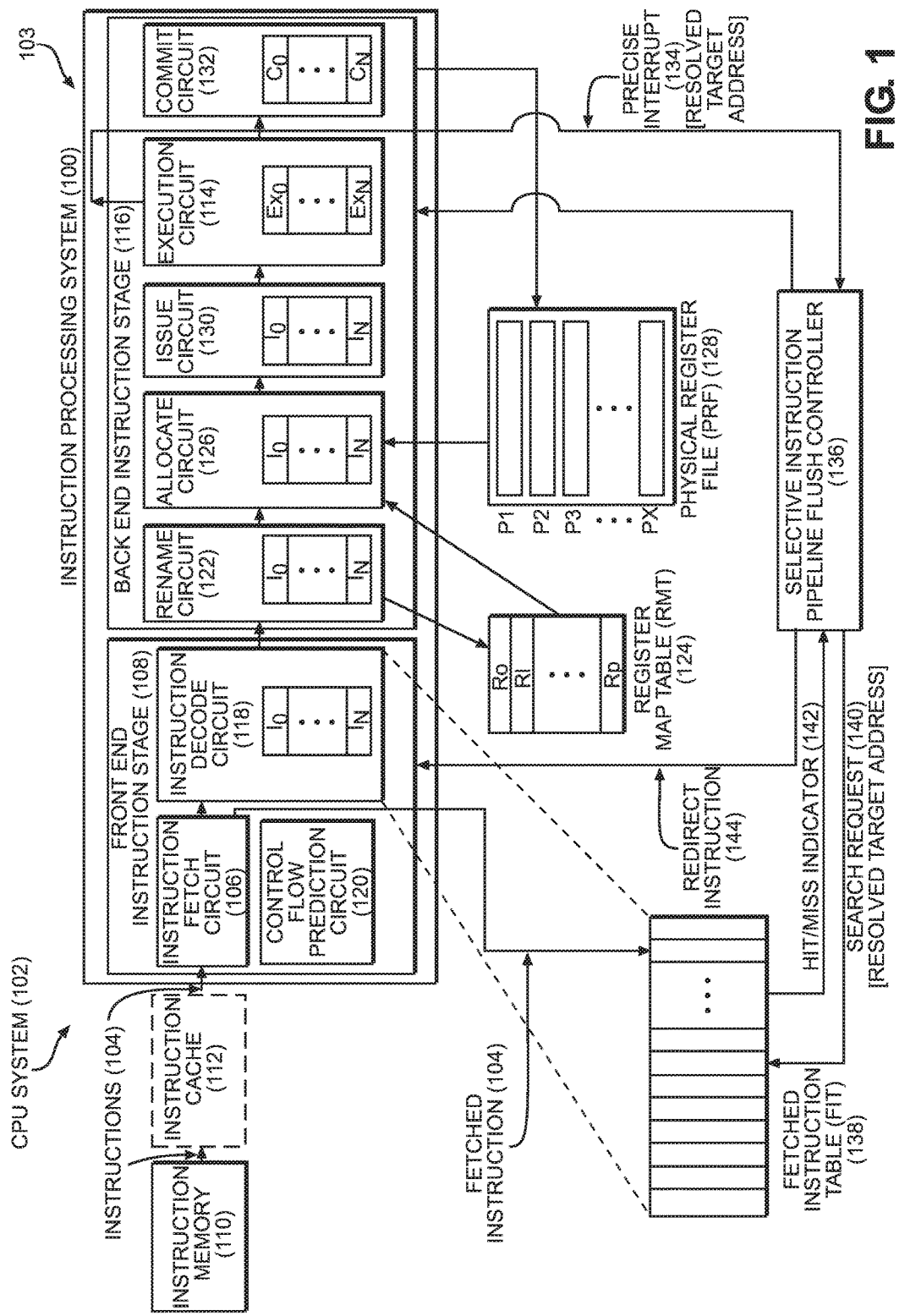
FIG. 1 is a block diagram of an exemplary instruction processing system in a central processing unit (CPU) system that includes an instruction pipeline configured to fetch instructions from instruction memory and process the fetched instructions to execution.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include selective flushing of instructions in an instruction pipeline in a processor back to an execution-determined target address, in response to a precise interrupt. The precise interrupt is generated in the processor as a result of a hazard occurring in instruction processing that would cause the execution of an instruction to result in an incorrect computational result. Examples of hazards that can cause precise interrupts are control hazards, such as branch mispredictions for example, structural hazards and data hazards. In this regard, in certain aspects disclosed herein, a selective instruction pipeline flush controller is provided in the processor. The selective instruction pipeline flush controller is configured to determine if a precise interrupt has occurred for an executed instruction in an execution stage of the instruction pipeline. The selective instruction pipeline flush controller determines if an instruction at the correct resolved target address of the instruction that caused the precise interrupt is contained in the instruction pipeline. If so, the selective instruction pipeline flush controller can selectively flush instructions back to the instruction in the instruction pipeline that contains the correct resolved target address to reduce the amount of new instruction fetching. This as opposed to all instructions located prior to the instruction that caused the precise interrupt being flushed. In this manner, as an example, the performance penalty of precise interrupts can be lessened through less instruction refetching and reduced delay in instruction pipeline refilling when the instruction containing the correct target address is already contained in the instruction pipeline.

In this regard, FIG. 1 is a block diagram of an exemplary instruction processing system 100 provided in a central processing unit (CPU) system 102. The CPU system 102 may be provided in a system-on-a-chip (SoC) 103 as an example. The instruction processing system 100 is configured to process instructions to be executed by a CPU or other processor or processing unit. In this regard, instructions 104 are fetched by an instruction fetch circuit 106 provided in a front end instruction stage 108 of the instruction processing system 100 from an instruction memory 110. The instruction memory 110 may be provided in or as part of a system memory in the CPU system 102 as an example. An instruction cache 112 may also be provided in the CPU system 102, as shown in FIG. 1, to cache the instructions 104 from the instruction memory 110 to reduce latency in the instruction fetch circuit 106 fetching the instructions 104. As will be discussed in more detail below, in this example, the instruction fetch circuit 106 is configured to provide the fetched instructions 104 into one or more instruction pipelines $I_0$-$I_N$ in the instruction processing system 100 to be pre-processed before the fetched instructions 104 reach an execution circuit 114 in a back end instruction stage 116 in the instruction processing system 100 to be executed. As will next be discussed, the instruction pipelines $I_0$-$I_N$ are provided across different processing circuits or stages of the instruction processing system 100 to pre-process and process the instructions 104 in a series of steps that perform concurrently to increase throughput prior to execution of the instructions 104 in the execution circuit 114.

With continuing reference to FIG. 1, the front end instruction stage 108 of the instruction processing system 100 in this example includes an instruction decode circuit 118. The instruction decode circuit 118 is configured to decode the fetched instructions 104 fetched by instruction fetch circuit 106 to determine the type of instruction and actions required, which in turn is used to determine in which instruction pipeline $I_0$-$I_N$ the instruction 104 should be placed. A control flow prediction circuit 120 is also provided in the front end instruction stage 108 to speculate or predict a target address for a control flow instruction 104, such as a conditional branch instruction. The prediction of the target address by the control flow prediction circuit 120 is used by the instruction fetch circuit 106 to determine the next instructions 104 to fetch behind the control flow instruction 104 assuming the control flow instruction 104 will be resolved to jump to the predicted target address.

With continuing reference to FIG. 1, in this example, the fetched instructions 104 are then placed in one or more of the instruction pipelines $I_0$-$I_N$ and are next provided to a renaming circuit 122 in the back end instruction stage 116 of the instruction processing system 100. The renaming circuit 122 is configured to determine if any register names in the decoded instructions 104 need to be renamed to break any register dependencies that would prevent parallel or out-of-order processing (OoP) of the instructions. The instruction processing system 100 in FIG. 1 is capable of processing instructions out-of-order, if possible, to achieve greater throughput performance and parallelism. However, the number of architectural registers provided in the CPU system 102 may be limited. In this regard, the renaming circuit 122 provided in the back end instruction stage 116 of the instruction processing system 100 is configured to call upon a register map table (RMT) 124 to rename the logical source and destination register names to available physical register names in a physical register file (PRF) 128 that typically provides more registers than architectural registers available. An allocate circuit 126 in a next step of the back end instruction stage 116 reads the physical registers containing source operands from a physical register file (PRF) 128 to determine if the producing instruction 104 responsible for producing the value has been executed. If the producing instruction 104 has not yet been executed, the value will be received by the producing instruction 104 via a live forwarding path. An issue circuit 130 (also known as a "dispatch circuit") can dispatch instructions 104 out-of-order to execution units $E_{X0}$-$E_{XN}$ in the execution circuit 114 after identifying and arbitrating among instructions 104 that have all their source operations ready. A commit circuit 132 is also provided in the back end instruction stage 116 as a final stage configured to update the architectural and memory state of the CPU system 102 for executed instructions 104 and to process exceptions caused by the executed instructions 104.

With continuing reference to FIG. 1, when a control flow instruction 104 is executed by the execution circuit 114, the execution circuit 114 will resolve the actual target address of the control flow instruction 104. In other words, the execution circuit 114 does not have to speculate or predict the target address. If the resolved target address is not the target address that was predicted by the control flow prediction circuit 120 in the front end instruction stage 108 used by instruction fetch circuit 106 as the starting address to fetch the subsequent instructions 104, this means a control flow misprediction was made by the control flow prediction circuit 120. The execution circuit 114 will generate a precise interrupt 134 in response to the misprediction, as shown in FIG. 1. The precise interrupt 134 is generated as an indication that a hazard has occurred in the execution circuit 114, and that the next instructions in one or more of the instruction pipelines $I_0$-$I_N$ should not be executed. For example, the hazard may be a structural hazard or a control flow hazard, such as a mispredicted branch instruction, as examples. In this regard, the instructions 104 in the instruction pipelines $I_0$-$I_N$ located prior to the executed instruction that caused the precise interrupt 134 are flushed. However, as discussed in more detail below, instead of flushing all instructions in the instruction pipelines $I_0$-$I_N$ located prior to the executed instruction 104 that caused the precise interrupt 134, the instruction processing system 100 is configured to selectively flush instructions 104 in the instruction pipelines $I_0$-$I_N$, if possible. If it is possible to only selectively flush instructions 104 in the instruction pipelines $I_0$-$I_N$ in response to a precise interrupt 134, instead of flushing all instructions 104, performance penalty of the precise interrupt 134 is reduced through less instruction refetching and reduced delay in the instruction fetch circuit 106 refilling the instruction pipelines $I_0$-$I_N$.

In this regard, with continuing reference to FIG. 1, a selective instruction pipeline flush controller 136 is provided in the instruction processing system 100. The selective instruction pipeline flush controller 136 is configured to perform the exemplary process 200 in FIG. 2, which will be described now in conjunction with FIG. 1 to perform selective flushing of instructions 104 in the instruction pipelines $I_0$-$I_N$ in the instruction processing system 100.

Figure 2:
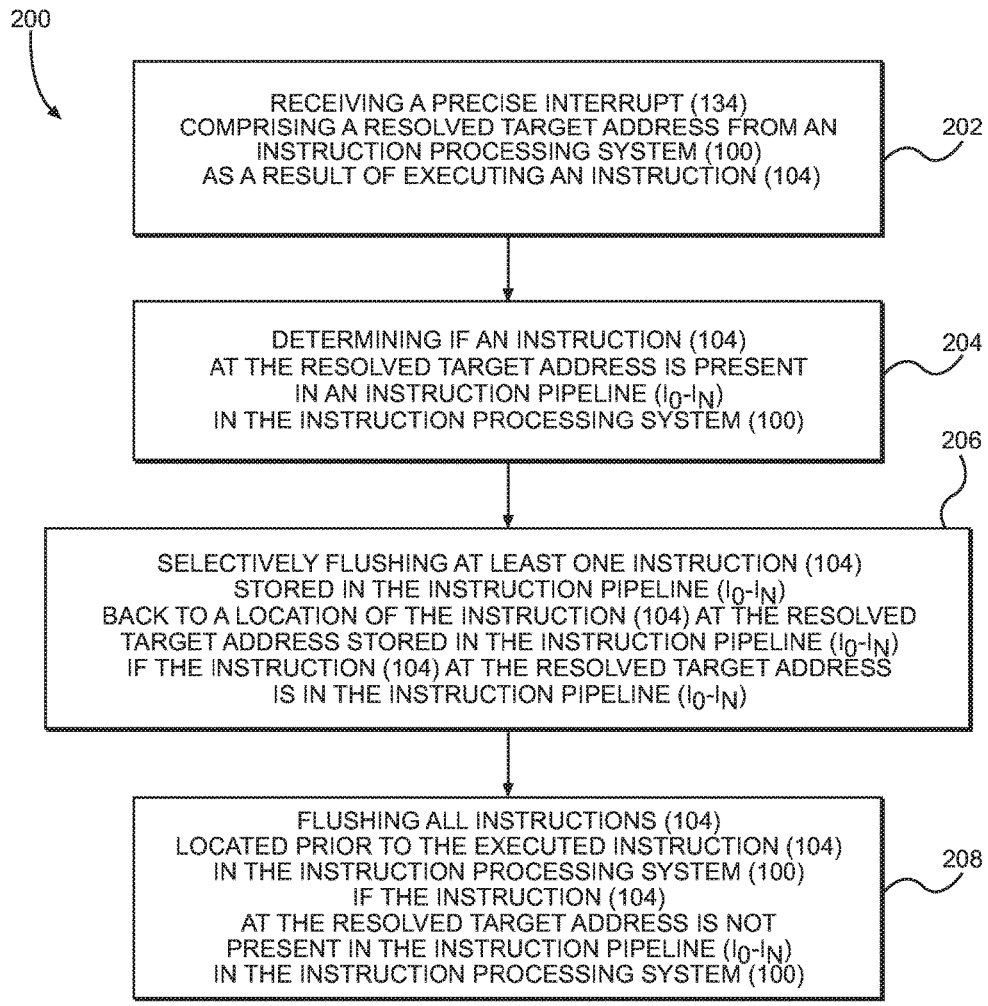
FIG. 2 is a flowchart illustrating an exemplary process of the selective instruction pipeline flush controller in FIG. 1 selectively flushing instructions back to the location of the target address of an executed instruction that caused a precise interrupt in the instruction pipeline in FIG. 1.
Figure 3:
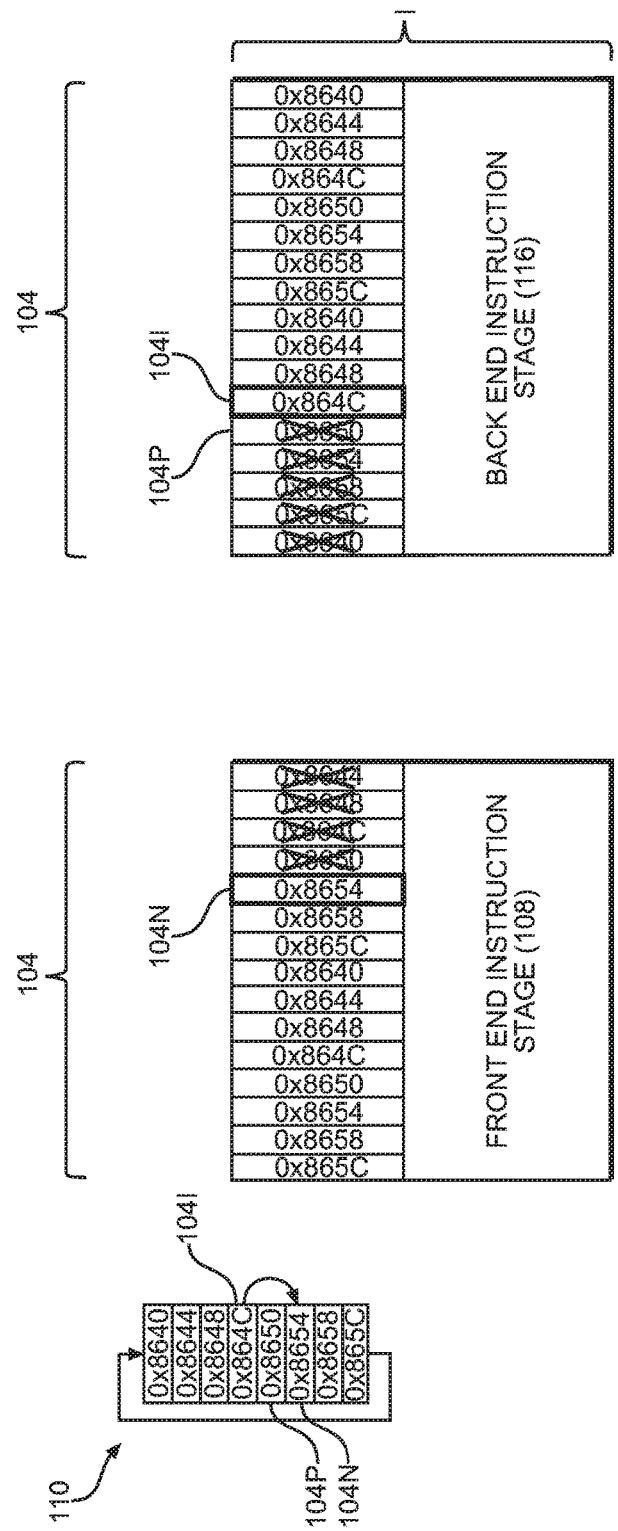
FIG. 3 is a block diagram illustrating an example of fetched instructions in front end and back end instruction stages of the instruction pipeline in FIG. 1 when an executed instruction causes a precise interrupt that will cause a selective instruction pipeline flush controller to perform selective pipeline flushing of the instruction pipeline back to a resolved target address of the executed instruction.

In this regard, the selective instruction pipeline flush controller 136 is configured to receive a precise interrupt 134 generated by the execution circuit 114 in the back end instruction stage 116 in this example (block 202 in FIG. 2). The received precise interrupt 134 includes the resolved target address from an instruction 104 executed in the execution circuit 114 that generated a hazard and caused the precise interrupt 134 to be generated. For example, FIG. 3 illustrates exemplary instructions 104 that are filled in an instruction pipeline I in the instruction processing system 100 in FIG. 1. In this example, conditional branch instruction 104I having address 0x864C in an instruction pipeline $I_0$-$I_N$ in the back end instruction stage 116 caused a precise interrupt 134 when executed. Instruction 104P was previously predicted to have a target address of 0x8650, because as shown in FIG. 3, the address of preceding instruction 104P fetched behind the instruction 104I is at address 0x8650. However, in this example, the resolved target address of the executed conditional branch instruction 104I turned out to be instruction 104N at address 0x8654, not instruction 104P at address 0x8650, as shown in the instruction memory 110.

In response, the selective instruction pipeline flush controller 136 in the instruction processing system 100 in FIG. 1 is configured to determine if an instruction 104 at the received resolved target address is already present in an instruction pipeline $I_0$-$I_N$ in the instruction processing system 100 (block 204 in FIG. 2). For example, as shown in the example pipeline I in FIG. 3, an instruction 104N at target address 0x8654, which is the resolved target address, is already present in the front end instruction stage 108 of the instruction pipeline I. For example, the next instance of an instruction 104N at the resolved target address 0x8654 is present in the front end instruction stage 108 of the instruction pipeline I. Thus, because an instruction at the received resolved target address (e.g., instruction 104N) is already present in the instruction pipeline $I_0$-$I_N$, the selective instruction pipeline flush controller 136 is configured to selectively flush instructions 104 stored in the instruction pipeline $I_0$-$I_N$ back to a location of the instruction 104 at the resolved target address stored in the instruction pipeline $I_0$-$I_N$ (block 206 in FIG. 2). In other words, this means that a next instruction 104 at the resolved target address has already been previously fetched in the instruction fetch circuit 106 and is already present in an instruction pipeline $I_0$-$I_N$. Said another way, a next instance of an instruction 104 at the resolved target address is already present in an instruction pipeline $I_0$-$I_N$. Thus, it is not required to flush all the instructions 104 in the instruction pipeline $I_0$-$I_N$ and refetch new instructions 104 starting at the resolved target address from the instruction memory 110 to resolve the executed, mispredicted control flow instruction 104, if an instruction at the resolved target address is already present in an instruction pipeline $I_0$-$I_N$.

For example, as shown in the example pipeline I in FIG. 3, the selective instruction pipeline flush controller 136 can selectively flush instructions 104 from and including instruction 104I to instruction 104N, but not including instruction 104N, to resolve the precise interrupt. In this manner, the instruction 104N will propagate through the instruction pipeline I to the back end instruction stage 116 where out-of-order instruction processing can be performed in this example, just as if instruction 104N and the subsequent instructions 104 were refetched from instruction memory. However, as shown in FIG. 3, instruction 104N will propagate through the instruction pipeline I to the back end instruction stage 116 in fewer processing cycles than if instruction 104N had to be fetched by the instruction fetch circuit 106 into the beginning of the instruction pipeline I.

However, with reference back to the instruction processing system 100 in FIG. 1, if an instruction 104 at the received resolved target address for an instruction that generated a precise interrupt is not present in an instruction pipeline $I_0$-$I_N$, the selective instruction pipeline flush controller 136 can still be configured to flush all instructions 104 in the instruction pipeline $I_0$-$I_N$ (block 208 in FIG. 2). Thus, the potential performance penalty from a precise interrupt may be reduced if an instruction 104 at the received resolved target address is present in the instruction pipeline $I_0$-$I_N$. However, even if an instruction 104 at the received resolved target address is not present in the instruction pipeline $I_0$-$I_N$, the performance penalty from a precise interrupt is no greater than if all instructions 104 were flushed from the instruction pipeline $I_0$-$I_N$ in any scenario.

Note that although the selective instruction pipeline flush controller 136 is shown separately outside of the front end instruction stage 108 in the instruction processing system 100 in FIG. 1, this is for illustrative purposes only. The selective instruction pipeline flush controller 136 could be provided in the front end instruction stage 108. The front end instruction stage 108 could also be provided particularly within the instruction fetch circuit 106 as an option, if desired.

With reference to FIG. 1, the selective instruction pipeline flush controller 136 may be configured to selectively flush the instructions 104 stored in the instruction pipeline back to a first earlier location of the instruction 104 at the resolved target address stored in the instruction pipeline $I_0$-$I_N$ to minimize instruction fetches to refill the instruction pipeline $I_0$-$I_N$. In the example instruction pipeline I in FIG. 3, the first earlier location of the instruction 104N at the resolved target address is located in the front end instruction stage 108, because in this example, the instruction 104N at the resolved target address is located in the front end instruction stage 108 to ensure that the instruction 104N is reprocessed in the back end instruction stage 116 since the instruction processing system 100 can perform out-of-order processing of instructions 104. The instructions 104 selectively flushed by the selective instruction pipeline flush controller 136 in response to the precise interrupt 134 include instructions 104 located in the instruction pipelines $I_0$-$I_N$ in the front end instruction stage 108 of the instruction processing system 100 in this example. The instructions 104 selectively flushed by the selective instruction pipeline flush controller 136 in response to the precise interrupt 134 can also include instructions 104 located in the instruction pipelines $I_0$-$I_N$ in the back end instruction stage 116 of the instruction processing system 100 located prior to the executed instruction 104 that caused the precise interrupt.

To facilitate the selective instruction pipeline flush controller 136 determining if an instruction 104 at the received resolved target address in response to a precise interrupt 134 is already present in an instruction pipeline $I_0$-$I_N$ in the instruction processing system 100, the selective instruction pipeline flush controller 136 can be configured to search the instructions 104 stored in the instruction pipelines $I_0$-$I_N$. However, this may delay the processing of instructions 104 in the front end instruction stage 108 and/or the back end instruction stage 116 of the instruction processing system 100. Further, the circuits in the front end instruction stage 108 and/or the back end instruction stage 116 of the instruction processing system 100 may not be designed or configured to provide for this access capability.

Figure 4A:
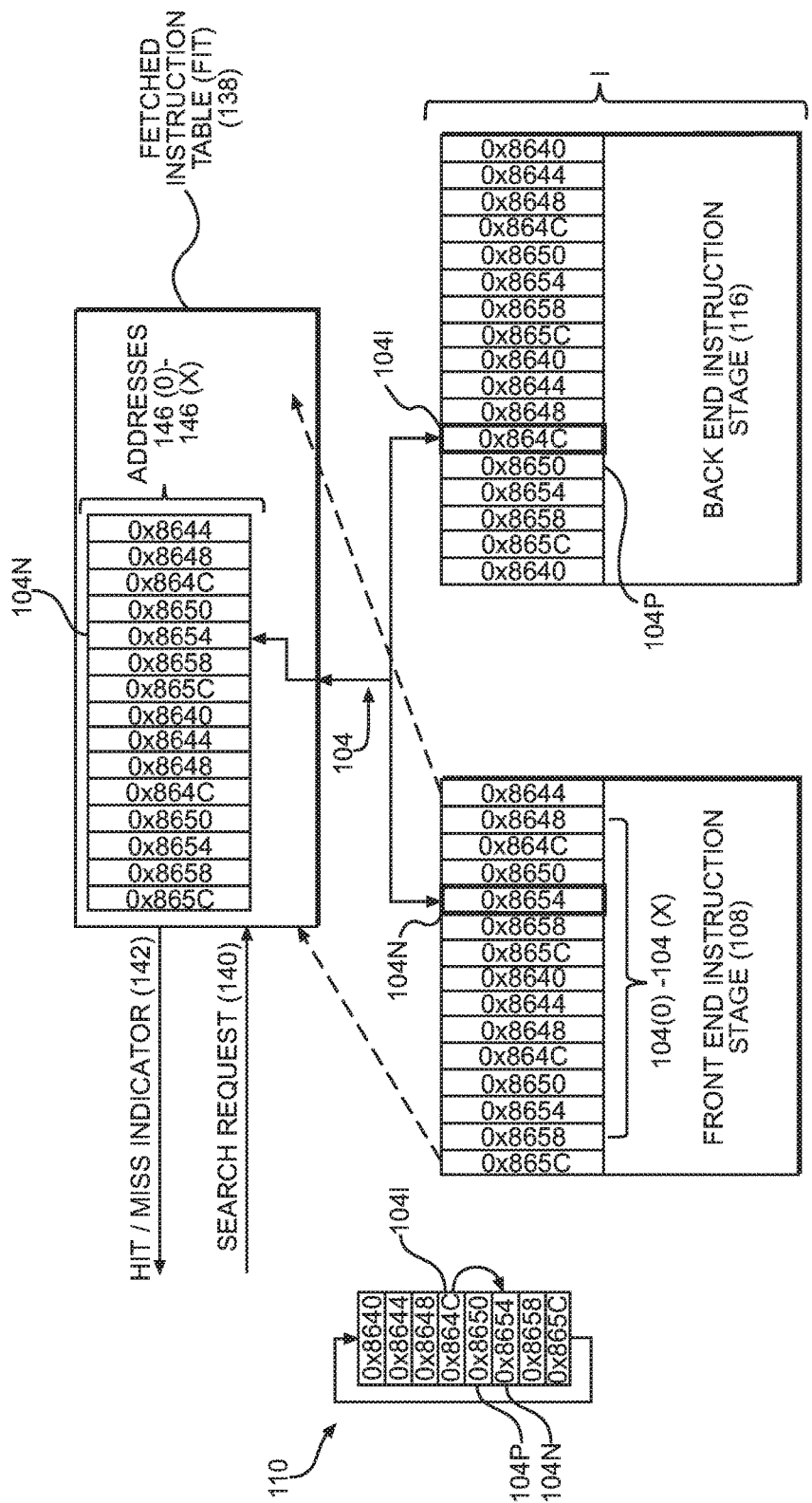
FIG. 4A is a block diagram illustrating an example of fetched instructions in front end and back end instruction stages of the instruction pipeline in FIG. 1 when an executed instruction causes a precise interrupt that will cause a selective instruction pipeline flush controller to perform selective pipeline flushing of the instruction pipeline back to a resolved target address of the executed instruction.

Thus, in the instruction processing system 100 in FIG. 1, an optional fetched instruction table (FIT) 138 may be employed. The FIT 138 allows the selective instruction pipeline flush controller 136 to determine if an instruction 104 at the resolved target address is present in the instruction pipeline $I_0$-$I_N$ as a result of the precise interrupt 134. In this regard, the instruction processing system 100 is configured to store the address of fetched instructions 104 as instructions 104 are fetched by the instruction fetch circuit 106. For example, the FIT 138 may be provided as a tag array, such as a translation lookaside buffer (TLB). In this example, the FIT 138 is configured to store the same number of addresses as instructions 104 can be present in the instruction pipeline $I_0$-$I_N$ in the front end instruction stage 108. In response to receiving a precise interrupt 134, the selective instruction pipeline flush controller 136 can issue a search request 140 containing the resolved target address to the FIT 138. This is shown by example in FIG. 4A. FIG. 4A shows the same instructions as present in the instruction pipeline I in FIG. 3 and thus will not be re-described. However, as shown in FIG. 4A, the FIT 138 also contains the fetched instruction addresses 146(0)-146(X) that correspond to the fetched instructions 104(0)-104(X) contained in the front end instruction stage 108 in this example. Thus, the FIT 138 can be consulted to determine if the instruction 104N at the resolved target address is contained therein, meaning it is also contained in the front end instruction stage 108 of the instruction pipeline I.

Figure 4B:
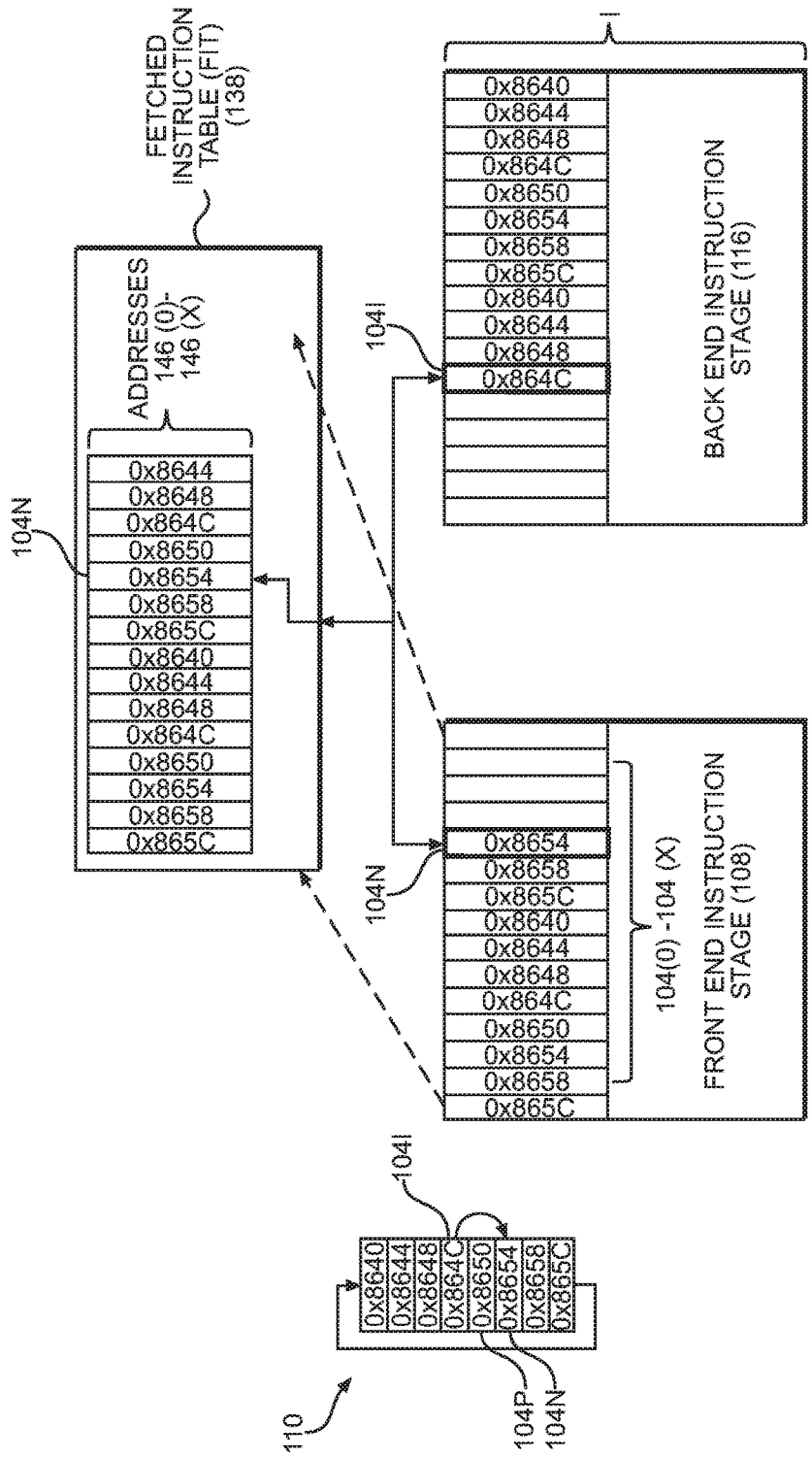
FIG. 4B is a block diagram illustrating the front end and back end instruction stages of the instruction processing system in FIG. 4A, after the selective instruction pipeline flush controller has selectively flushed instructions back to a resolved target address of an executed instruction that caused a precise interrupt.

With reference back to FIG. 1, in response to the search request 140 issued by the selective instruction pipeline flush controller 136 to the FIT 138, the FIT 138 is configured to perform a look-up to determine if the resolved target address is contained in the stored fetched instruction addresses 146(0)-146(X) (shown in FIG. 4A) in the FIT 138. In response, the FIT 138 is configured to provide a hit/miss indicator 142 to the selective instruction pipeline flush controller 136 indicating if the resolved target address is present in the FIT 138. If resolved target address is present in the stored fetched instruction addresses 146(0)-146(X) in the FIT 138, as indicated by a hit in the hit/miss indicator 142 received from the FIT 138, the selective instruction pipeline flush controller 136 is configured to provide a redirect instruction 144 to selectively flush instructions 104 among the fetched instruction 104(0)-104(X) (shown in FIG. 4A). The redirect instruction 144 causes the instructions 104 present in the instruction pipeline $I_0$-$I_N$ located prior to the executed instruction 104 that caused the precise interrupt 134 back to the location of the instruction at the resolved target address to be selectively flushed. In this example, the selective instruction pipeline flush controller 136 knows the locations of the instructions 104 in the front end instruction stage 108 in the instruction pipeline $I_0$-$I_N$, because the addresses of these instructions 104 are present in the same order in the FIT 138 as in the front end instruction stage 108. This is shown by example in the instruction pipeline in FIG. 4B. As shown therein, instructions prior to instruction 104I that caused the precise interrupt 134 back to the location of the instruction 104N at the resolved target address of instruction 104I in the front end instruction stage 108 are shown flushed.

However, if resolved target address is not present in the FIT 138, as indicated by a miss in the hit/miss indicator 142 received from the FIT 138, the selective instruction pipeline flush controller 136 is configured to provide a redirect instruction 144 to the instruction processing system 100 to flush all the instructions 104 in the instruction pipeline $I_0$-$I_N$, including instructions 104(0)-104(X), located prior to the executed instruction 104 that caused the precise interrupt.

If the instruction processing system 100 in FIG. 1 contains multiple instruction pipelines $I_0$-$I_N$, it may be desired to configure the selective instruction pipeline flush controller 136 to selectively flush only certain instruction pipelines $I_0$-$I_N$ that contain the instruction 104 at the resolved target address while leaving intact other instruction pipelines $I_0$-$I_N$ that do not contain the hazard caused by execution of a instruction 104. In this regard, it may be desired to provide a method for the selective instruction pipeline flush controller 136 to also determine which instruction pipeline(s) $I_0$-$I_N$ should be selectively flushed.

Figure 5:
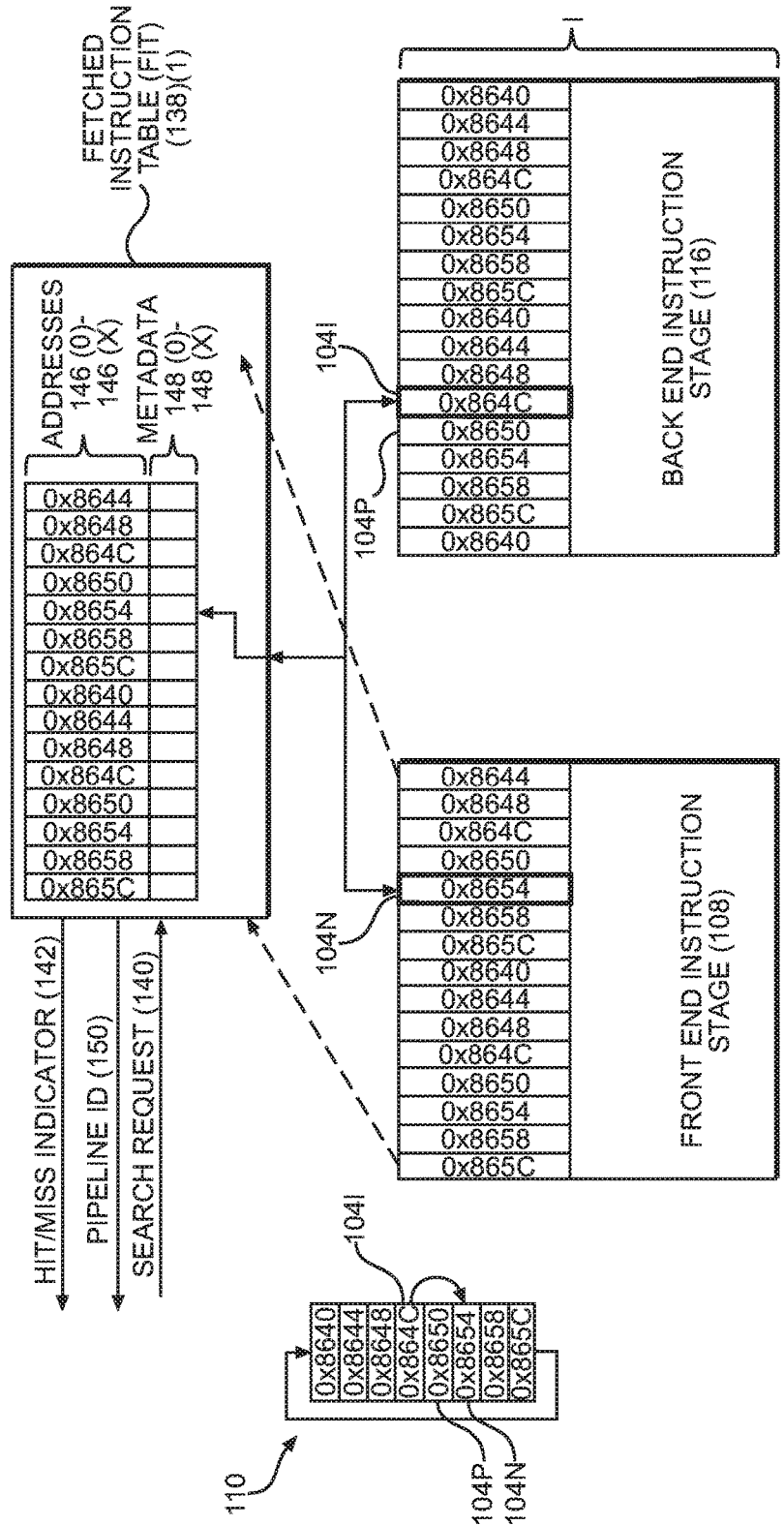
FIG. 5 is a block diagram illustrating the front end and back end instruction stages of the instruction pipeline in FIG. 1 and an alternative exemplary fetched instruction table (FIT) configured to store the address of fetched instructions in the front end instruction stage of the instruction pipeline with associated metadata indicating the instruction pipeline in the instruction processing system in which the fetched instruction in the front end instruction stage is located.

In this regard, as shown in FIG. 5, a revised FIT 138(1) can be provided to also contain metadata 148(0)-148(X) associated with each fetched instruction address 146(0)-146(X) of the fetched instructions 104(0)-104(X). The metadata 148(0)-148(X) identifies the instruction pipelines $I_0$-$I_N$ in which the fetched instruction 104(0)-104(X) corresponding to the fetched instruction address 146(0)-146(X) in the FIT 138(1) was issued by the instruction processing system 100 in FIG. 1. Thus, when the selective instruction pipeline flush controller 136 issues a search request 140 to the FIT 138(1) in FIG. 5, the FIT 138(1) is configured to return the hit/miss indicator 142 as well as a pipeline identification (ID) 150 identifying the instruction pipeline $I_0$-$I_N$ that contains the instruction 104 at the resolved target address for redirection. The selective instruction pipeline flush controller 136 can then use the pipeline ID 150 to cause the identified instruction pipelines $I_0$-$I_N$ to be selectively flushed.

Figure 6A:
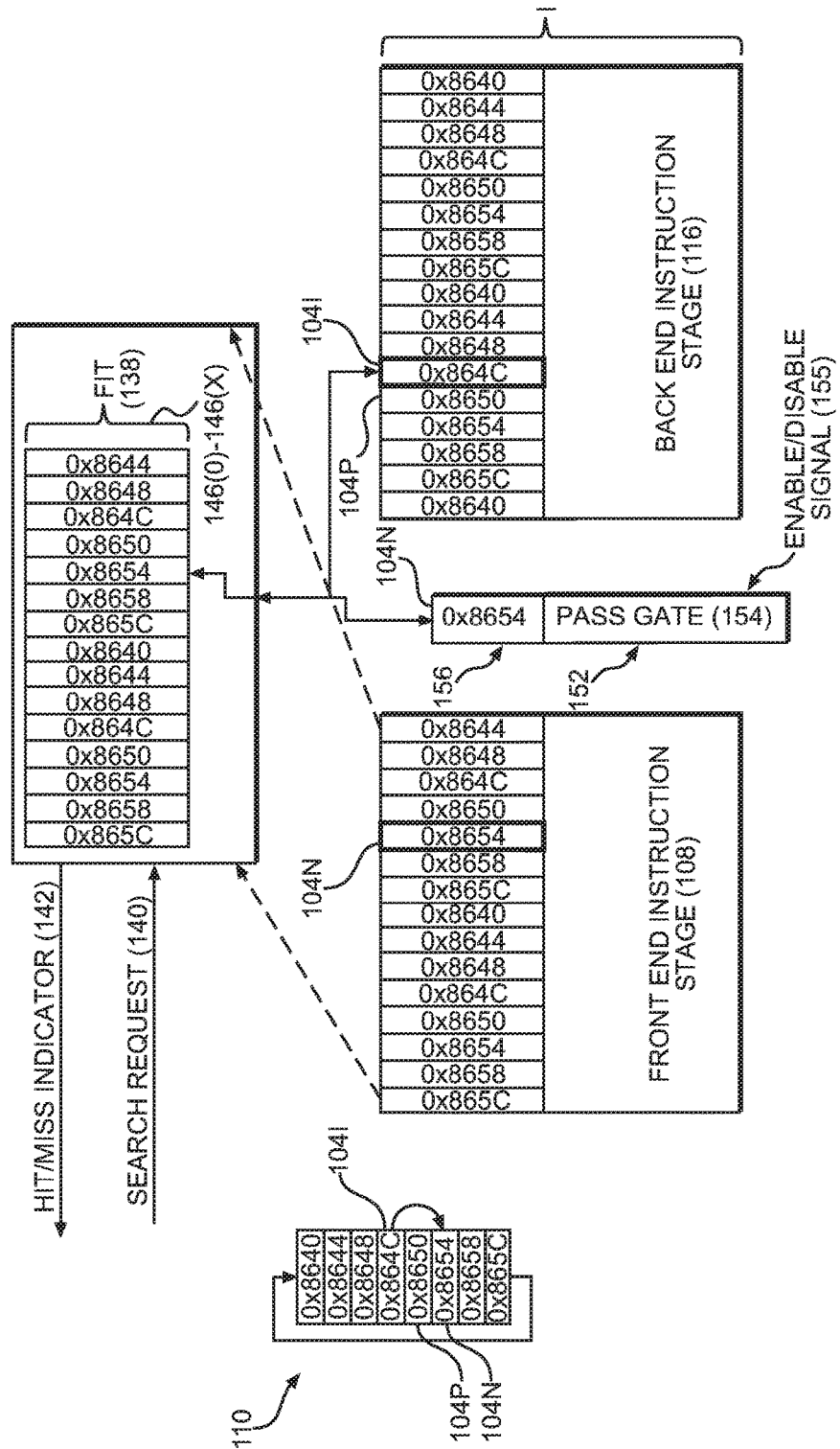
FIGS. 6A and 6B are block diagrams illustrating the front end and back end instruction stages of the instruction pipeline in FIG. 1 and additionally employing a pass gate used by the selective instruction pipeline flush controller to compare the address of the next instruction advanced in the instruction pipeline to the resolved target address for an executed instruction that caused a precise interrupt for performing selective pipeline flushing of the instruction pipeline.

As another non-limiting example, it may be desired to provide another method of identifying the instruction pipeline $I_0$-$I_N$ to be selectively flushed as opposed to providing metadata 148(0)-148(X) in the FIT 138(1), as shown in FIG. 5. In this regard, FIG. 6A illustrates the same instruction pipeline I and FIT 138 shown in FIG. 4A. However, an additional address buffer 152 is provided in the instruction pipeline I. An address buffer 152 may be provided for each instruction pipeline $I_0$-$I_N$ in the instruction processing system 100. In this example, the address buffer 152 is a pass gate 154 as a non-limiting example. The pass gate 154 is configured to store a resolved target address 156 of a resolved target address of an executed instruction that caused a precise interrupt. The execution circuit $E_{X0}$-$E_{XN}$ (shown in FIG. 1) that generated the precise interrupt can be configured to enable the pass gate 154 via an enable/disable signal 155 in response to a precise interrupt 134. In this example, the execution circuit $E_{X0}$-$E_{XN}$ that generated the precise interrupt can be configured to store the resolved target address of the executed instruction in the address buffer 152 assigned to its instruction pipeline $I_0$-$I_N$ as a selective instruction pipeline flush controller 136. For example, the address of 0x8654 is stored in the pass gate 154 in FIG. 6A, which is the resolved target address of instruction 104N. The pass gate 154 is disposed between the front end instruction stage 108 and the back end instruction stage 116 in an instruction pipeline $I_0$-$I_N$ in this example.

Figure 6B:
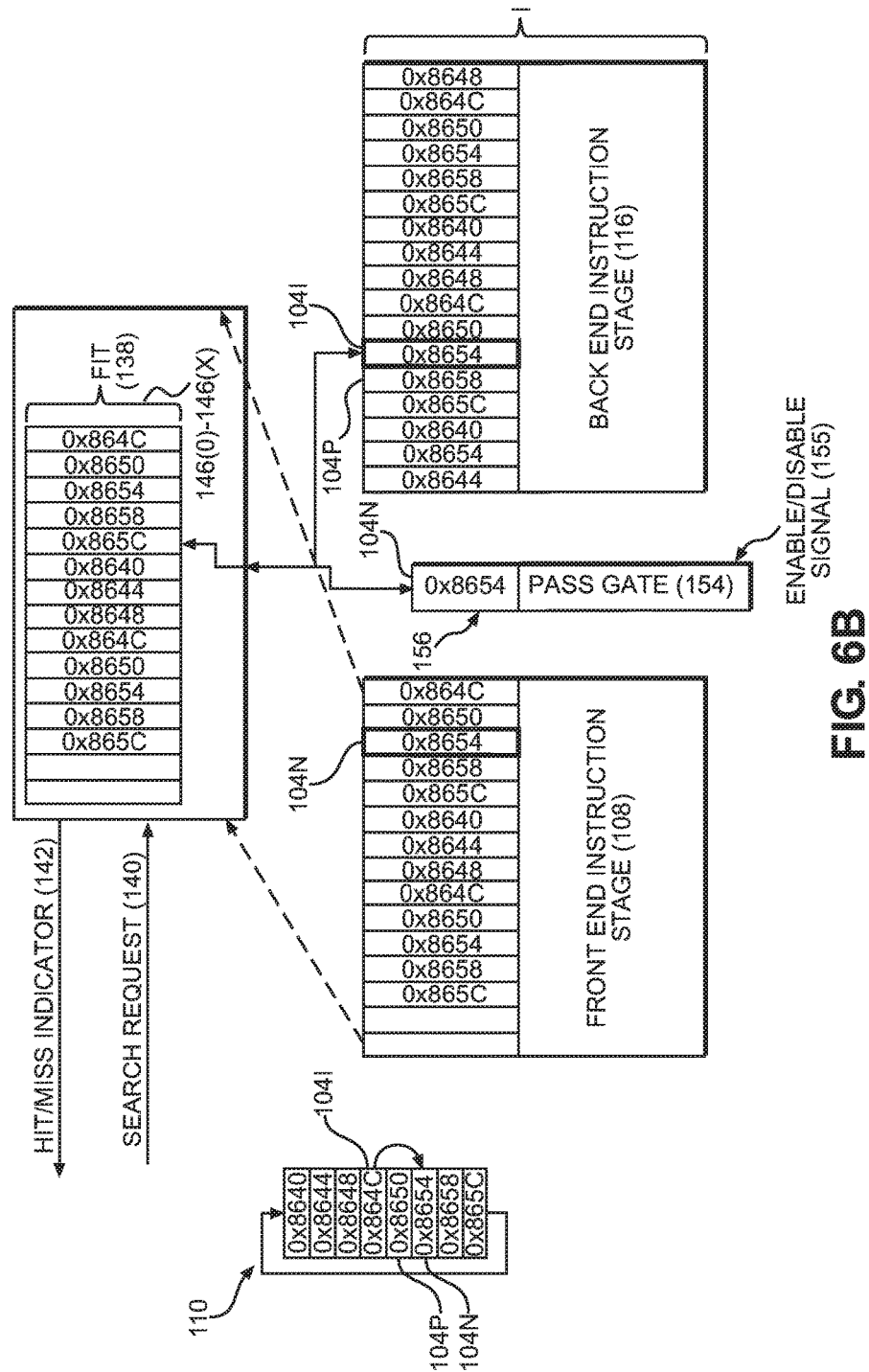

In this manner, as shown in FIG. 6B, the instructions 104 between the executed instruction 104I and the instruction 104N at the resolved target address in the front end instruction stage 108 do not have to be affirmatively selectively flushed by the selective instruction pipeline flush controller 136. Instead, the instructions 104 are propagated through the instruction pipeline $I_0$-$I_N$ as normal. The fetched target address of each instruction 104 that is to be passed from the front end instruction stage 108 to the back end instruction stage 116 in this example is compared to the resolved target address 156 stored in the pass gate 154. If pass gate 154 does not indicate that the fetched target address of each instruction 104 matches the resolved target address 156 stored in the pass gate 154, the instruction 104 at the fetched target address is not dropped or not passed to the back end instruction stage 116, effectively flushing that instruction 104. Once the pass gate 154 indicates that the fetched target address of the next instruction 104 to be passed to back end instruction stage 116 matches the resolved target address, the pass gate 154 is disabled by the enable/disable signal 155. In this manner, the instruction 104 that was present in the instruction pipeline I at the resolved target address is retained and passed to the back end instruction stage 116, and the instruction processing system 100 operates as normal.

It may also be desired to recover the speculative state of the CPU system 102 that existed prior to the control flow prediction circuit 120 in FIG. 1 predicting the target address of a fetched instruction 104 that is later executed and causes a precise interrupt 134. In this manner, the speculative state of the CPU system 102 based on subsequent fetched instructions 104 that are subsequently selectively flushed as following an instruction 104 whose execution caused a precise interrupt 134 to be generated, is not retained. In other words, the speculative state of the CPU system 102 can be restored back to its condition as if the proper branch target address has not been mispredicted. This may result in a more accurate speculative state of the CPU system 102 in response to a selective flush.

In this regard, FIG. 7A illustrates example instructions 104 (labeled i0-i15) fetched into an instruction pipeline I in the instruction processing system 100 in FIG. 1. In this example, the selective instruction pipeline flush controller 136 (see FIG. 1) will selectively flush instructions i1-i4 in response to a precise interrupt 134 (see FIG. 1) generated as a result of executing instruction i0. Instruction i5 contains the resolved target address of instruction i0, and thus instructions i5-i15 are not selectively flushed in response to the precise interrupt 134 generated by execution of instruction i0. However, as shown in FIG. 7A, a global history register (GHR) 160 has been updated based on instruction predictions for branch instructions i0, i1, i3, and i6. The GHR 160 is used by the control flow prediction circuit 120 (shown in FIG. 1) to predict future target addresses of branch instructions in this example based on the taken ('1') or not taken ('0') branch indicators 162 in the GHR 160. For example, branch indicator 162(7) corresponds to instruction i1 and branch indicator 162(8) corresponds to instruction i3. However, if branch instructions i1 and i3 are selectively flushed by the selective instruction pipeline flush controller 136, the GHR 160 is still influenced and updated by the processing of branch instructions i1 and i3 in the instruction pipeline I. Thus, the selective instruction pipeline flush controller 136 may be further configured to restore the desired state of the GHR 160 in this example as if the instructions i0-i4, which include branch instructions i1 and i3, were not fetched by the instruction fetch circuit 106 based on the branch prediction of instruction i0.

In this regard, as illustrated in FIG. 7B, and after block 206 in the flowchart in FIG. 2 in response to a selective flush of instructions 104 by the selective instruction pipeline flush controller 136, the selective instruction pipeline flush controller 136 can be further configured to restore the GHR 160 to a speculative state as if selectively flushed instructions had not been fetched. In the example of FIG. 7A, this is instructions i1-i4. As shown in FIG. 7B, instructions i1-i4 have been selectively flushed. Additionally, the selective instruction pipeline flush controller 136 shifts the branch indicators 162 in the GHR 160 by two indicators to the right to effectively erase the indicators 162(7) and 162(8) shown in FIG. 7A corresponding to selectively flushed branch instructions i1 and i3, in this example.

Figure 8:
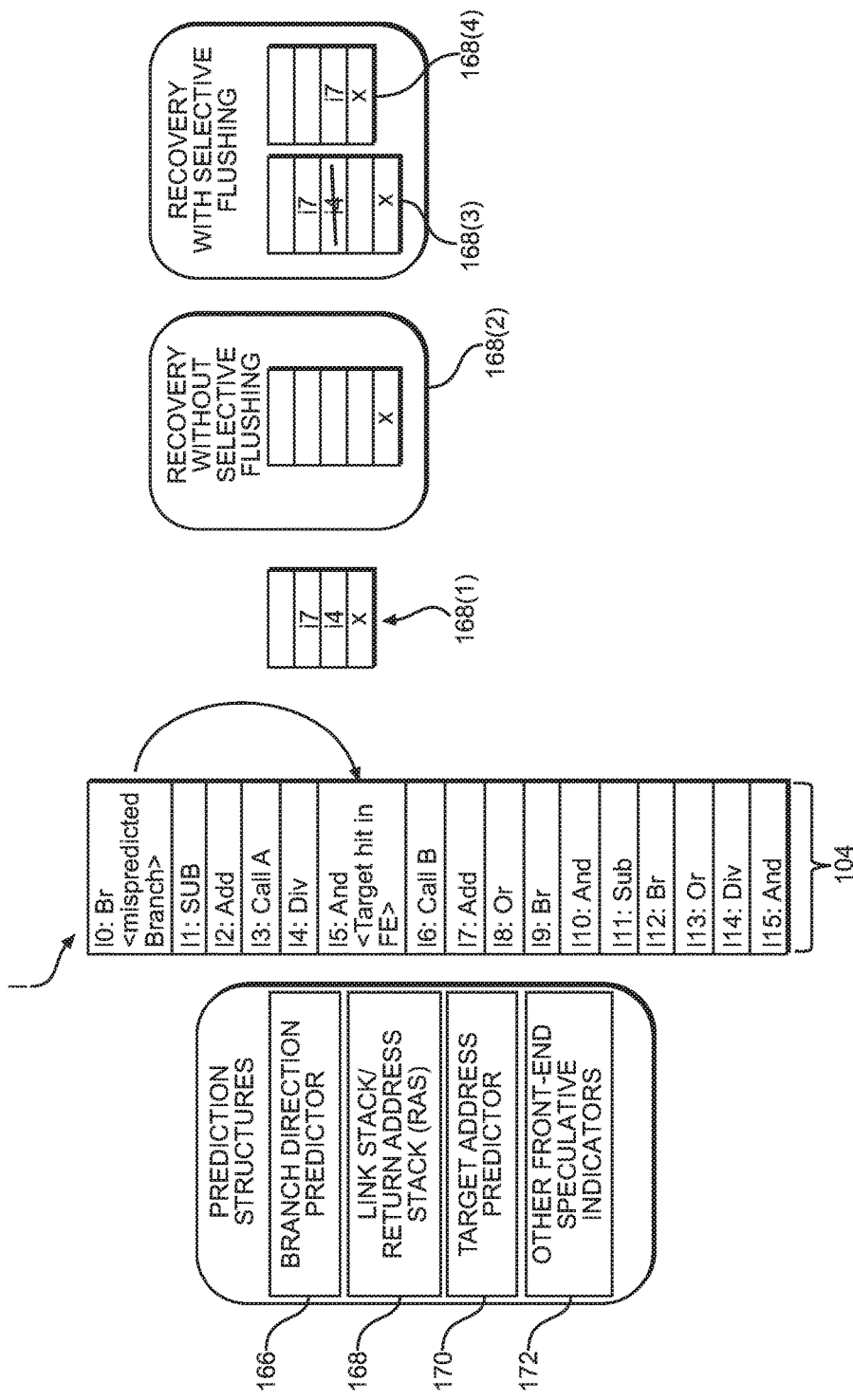
FIG. 8 is a block diagram of link state and selective prediction state recovery that can be employed in the instruction pipeline in FIG. 1 in response to a selective pipeline flush.

Other speculative state indicators of the CPU system 102 in FIG. 1 could also be recovered by the selective instruction pipeline flush controller 136 in response to a precise interrupt 134 generated as a result of executing an instruction 104 in a pipeline I. For example, such speculative state indicators could include a branch direction predictor 166, a link stack 168 also known as a return address stack (RAS), a target address predictor 170, and other front end instruction stage speculative indicators 172 used to control processing of instructions 104 in the front end instruction stage 108 of an instruction pipeline I, as shown in FIG. 8. For example, the link stack 168 for the CPU system 102 in FIG. 1 prior to execution of instruction i0 that caused a precise interrupt 134 (using the example in FIGS. 7A and 7B) may appear as link stack 168(1) in FIG. 8 including instructions i7 and i4. Without employing speculative pipeline flushing, the link stack 168(1) in FIG. 8 would normally be recovered by removing instructions i4 and i7 if all instructions in the pipeline I were flushed, as shown in link stack 168(2). However, in this example, by employing selective instruction flushing, the selective instruction pipeline flush controller 136 can be configured to only remove instruction i4 in this example, as shown in link stack 168(3) to keep the link stack 168(3) precise, as if instruction i4 has not been fetched in its previous location since instruction i4 is selectively flushed. However, instruction i7 is not erased from the link stack 168(3) in this example. Another way of recovering the link stack 168(1) is to remove instruction i4 and i7 as a baseline process after a selective flush of instructions i1-i3 by the selective instruction pipeline flush controller 136. Then, during the link stack recovery process by the selective instruction pipeline flush controller 136, the selective instruction pipeline flush controller 136 could push instruction i7 back onto the link stack as shown in link stack 168(4) in FIG. 8. Instruction i7 could be found as a retained instruction in the instruction pipeline I after selective flushing.

A processing unit that includes an instruction processing system configured to selectively flush instructions in an instruction pipeline back to a resolved target address for an executed instruction that caused a precise interrupt, and according to aspects disclosed herein, may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 9:
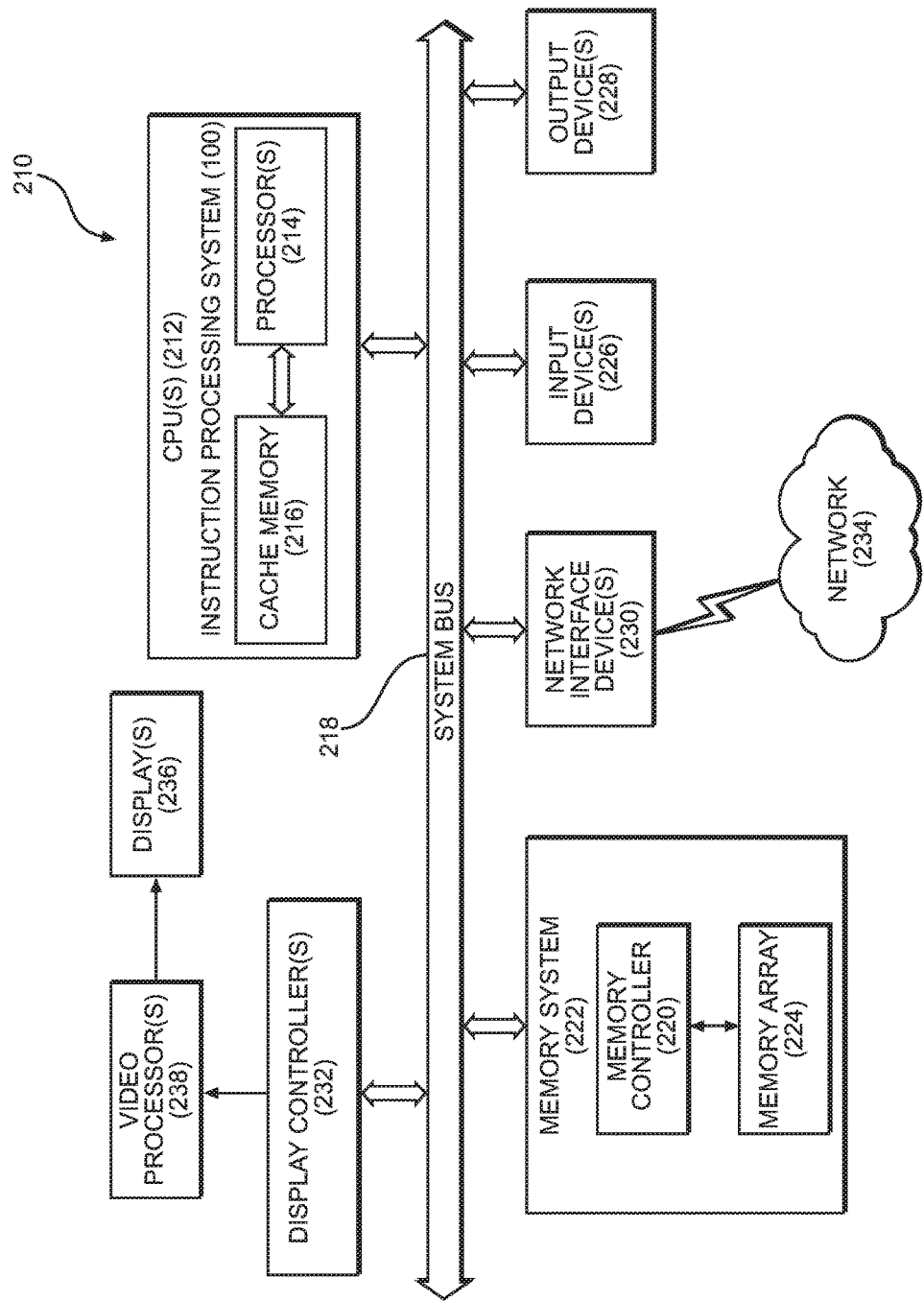
FIG. 9 is a block diagram of an exemplary processor-based system that includes a central processing unit (CPU) that includes an instruction processing system configured to selectively flush instructions in an instruction pipeline back to a resolved target address for an executed instruction that caused a precise interrupt.

In this regard, FIG. 9 illustrates an example of a processor-based system 210 that can that include an instruction processing system configured to selectively flush instructions in an instruction pipeline back to a resolved target address for an executed instruction that caused a precise interrupt, and according to any of the particular aspects discussed above. In this example, the processor-based system 210 includes a central processing unit (CPU) 212 that includes one or more processors 214, also known as processing units. The instruction processing system 100 in FIG. 1 could be included in the CPU 212 or any of the processors 214. The processor(s) 214 is configured to reset a timer on idle process scheduling for one or more of the CPUs 212 to increase operational scaling response times with reduced impact on processing unit performance according to aspects disclosed herein. The CPU 212 may have a cache memory 216 coupled to the processors 214 for rapid access to temporarily stored data. The CPU 212 is coupled to a system bus 218 and can intercouple peripheral devices included in the processor-based system 210. As is well known, the CPU 212 communicates with these other devices by exchanging address, control, and data information over the system bus 218. For example, the CPU 212 can communicate bus transaction requests to a memory controller 220 in a memory system 222 as an example of a slave device. Although not illustrated in FIG. 9, multiple system buses 218 could be provided, wherein each system bus 218 constitutes a different fabric. In this example, the memory controller 220 is configured to provide memory access requests to a memory array 224 in the memory system 222.

Other devices can be connected to the system bus 218. As illustrated in FIG. 9, these devices can include the memory system 222, one or more input devices 226, one or more output devices 228, one or more network interface devices 230, and one or more display controllers 232, as examples. The input device(s) 226 can include any type of input device, including but not limited to input keys, switches, voice processors, etc. The output device(s) 228 can include any type of output device, including but not limited to audio, video, other visual indicators, etc. The network interface device(s) 230 can be any devices configured to allow exchange of data to and from a network 234. The network 234 can be any type of network, including but not limited to a wired or wireless network, a private or public network, a local area network (LAN), a wireless local area network (WLAN), a wide area network (WAN), a BLUETOOTH™ network, and the Internet. The network interface device(s) 230 can be configured to support any type of communications protocol desired.

The CPU 212 may also be configured to access the display controller(s) 232 over the system bus 218 to control information sent to one or more displays 236. The display controller(s) 232 sends information to the display(s) 236 to be displayed via one or more video processors 238, which process the information to be displayed into a format suitable for the display(s) 236. The display(s) 236 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A controller for a processor, the controller configured to:
   receive, from an instruction processing system, a precise interrupt, comprising a resolved target address of a first instruction within an instruction pipeline in the instruction processing system, as a result of a hazard generated by executing the first instruction;
   responsive to receiving the precise interrupt, determine whether a second instruction at the resolved target address is present in the instruction pipeline in the instruction processing system; and
   responsive to determining that the second instruction at the resolved target address is present in the instruction pipeline, flush at least one instruction fetched subsequent to the first instruction and prior to the second instruction in the instruction pipeline.

2. The controller of claim 1 further configured to, responsive to determining that the second instruction at the resolved target address is not present in the instruction pipeline in the instruction processing system, flush all instructions in the instruction pipeline fetched subsequent to the first instruction.

3. The controller of claim 1 further configured to, further responsive to determining that the second instruction at the resolved target address is present in the instruction pipeline, not redirect fetching of the instruction pipeline.

4. The controller of claim 1 further configured to, further responsive to determining that the second instruction at the resolved target address is present in the instruction pipeline, flush the at least one instruction fetched subsequent to the first instruction and prior to a first earlier location of the second instruction at the resolved target address in the instruction pipeline.

5. The controller of claim 1 configured to:
   receive the precise interrupt comprising the resolved target address of the first instruction from a back end instruction stage in the instruction processing system as a result of executing the first instruction;
   determine whether the second instruction at the resolved target address is present in the instruction pipeline in the instruction processing system by being configured to determine whether the second instruction at the resolved target address is present in a front end instruction stage of the instruction pipeline in the instruction processing system; and
   flush the at least one instruction fetched subsequent to the first instruction and prior to the second instruction in the instruction pipeline by being configured to flush at least one instruction in the front end instruction stage of the instruction pipeline fetched prior to the second instruction at the resolved target address in the front end instruction stage of the instruction pipeline.

6. The controller of claim 5 further configured to, further responsive to determining that the second instruction at the resolved target address is present in the front end instruction stage of the instruction pipeline, flush at least one instruction fetched subsequent to the first instruction in the back end instruction stage of the instruction pipeline.

7. The controller of claim 1 configured to determine whether the second instruction at the resolved target address is present in the instruction pipeline in the instruction processing system by being configured to:
   provide the received resolved target address to a fetched instruction table storing one or more fetched instruction addresses for one or more instructions in the instruction pipeline;
   responsive to providing the received resolved target address to the fetched instruction table, receive a hit/miss indicator indicating whether the resolved target address is present as a fetched instruction address in the fetched instruction table; and
   responsive to the hit/miss indicator indicating that the resolved target address is present as a fetched instruction address in the fetched instruction table, flush the at least one instruction fetched subsequent to the first instruction and prior to the second instruction in the instruction pipeline.

8. The controller of claim 7 further configured to, responsive to the hit/miss indicator indicating that the resolved target address is not contained as a fetched instruction address in the fetched instruction table, issue a complete flush instruction to cause the instruction pipeline to flush all instructions in the instruction pipeline fetched subsequent to the first instruction.

9. The controller of claim 7 further configured to determine a location of the second instruction at the resolved target address based on a location of the fetched instruction address matching the resolved target address in the fetched instruction table.

10. The controller of claim 7 further configured to:
    receive a pipeline indicator stored in metadata in association with each fetched instruction address contained in the fetched instruction table; and
    identify the instruction pipeline in the instruction processing system containing the resolved target address; and
    configured to flush the at least one instruction by being configured to, responsive to the hit/miss indicator indicating that the resolved target address is present in the fetched instruction table, flush the at least one instruction fetched subsequent to the first instruction and prior to the second instruction in the identified instruction pipeline.

11. The controller of claim 1 configured to flush the at least one instruction in the instruction pipeline by being configured to:
    compare a next fetched instruction address in the instruction processing system to the resolved target address in an address buffer; and
    flush the next fetched instruction address in the instruction processing system responsive to the next fetched instruction address not matching the resolved target address in the address buffer.

12. The controller of claim 11 wherein:
the address buffer comprises a pass gate; and
the controller is configured to flush the next fetched instruction address in the instruction processing system responsive to the next fetched instruction address not matching the resolved target address in the pass gate.

13. The controller of claim 5 configured to flush the at least one instruction in the front end instruction stage of the instruction pipeline by being configured to:
compare a next fetched instruction address in the instruction processing system to the resolved target address in an address buffer; and
flush the next fetched instruction address in the front end instruction stage of the instruction processing system responsive to the next fetched instruction address not matching the resolved target address in the address buffer.

14. The controller of claim 1 further configured to, responsive to determining that the second instruction at the resolved target address is present in the instruction pipeline in the instruction processing system, recover a speculative state of the processor that existed prior to prediction of the first instruction in the instruction processing system.

15. The controller of claim 14 configured to, responsive to determining that the second instruction at the resolved target address is present in the instruction pipeline in the instruction processing system, recover a branch prediction speculative state of the processor that existed prior to the prediction of the first instruction in the instruction processing system.

16. The controller of claim 14 configured to, responsive to determining that the second instruction at the resolved target address is present in the instruction pipeline in the instruction processing system, recover a link stack state of the processor that existed prior to the prediction of the first instruction in the instruction processing system.

17. The controller of claim 1 integrated into a system-on-a-chip (SoC).

18. The controller of claim 1 integrated into a device selected from the group consisting of: a set top box; an entertainment unit; a navigation device; a communications device; a fixed location data unit; a mobile location data unit; a mobile phone; a cellular phone; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; and a portable digital video player.

19. An apparatus for flushing instructions in an instruction processing system in a processor, comprising:
means for receiving a precise interrupt, comprising a resolved target address of a first instruction within an instruction pipeline in the instruction processing system, as a result of a hazard generated by executing the first instruction;
means for determining whether a second instruction at the resolved target address is present in the instruction pipeline in the instruction processing system, responsive to receiving the precise interrupt; and
means for flushing at least one instruction fetched subsequent to the first instruction and prior to the second instruction in the instruction pipeline, responsive to determining that the second instruction at the resolved target address is present in the instruction pipeline.

20. A method of flushing an instruction pipeline in an instruction processing system in a processor, comprising:
receiving a precise interrupt, comprising a resolved target address of a first instruction within an instruction pipeline in the instruction processing system, as a result of a hazard generated by executing the first instruction;
responsive to receiving the precise interrupt, determining whether a second instruction at the resolved target address is present in the instruction pipeline in the instruction processing system; and
responsive to determining that the second instruction at the resolved target address is present in the instruction pipeline, flushing at least one instruction fetched subsequent to the first instruction and prior to the second instruction in the instruction pipeline.

21. The method of claim 20 further comprising, responsive to determining that the second instruction at the resolved target address is not present in the instruction pipeline in the instruction processing system, flushing all instructions fetched subsequent to the first instruction.

22. The method of claim 20 further comprising, further responsive to determining that the second instruction at the resolved target address is present in the instruction pipeline, not redirecting fetching of the instruction pipeline.

23. The method of claim 20 wherein flushing the at least one instruction further comprises flushing the at least one instruction fetched subsequent to the first instruction and prior to a first earlier location of the second instruction at the resolved target address in the instruction pipeline.

24. The method of claim 20 wherein determining whether the second instruction at the resolved target address is present in the instruction pipeline in the instruction processing system comprises:
providing the received resolved target address to a fetched instruction table storing one or more fetched instruction addresses for one or more instructions in the instruction pipeline;
responsive to providing the received resolved target address to the fetched instruction table, receiving a hit/miss indicator indicating whether the resolved target address is present as a fetched instruction address in the fetched instruction table; and
responsive to the hit/miss indicator indicating that the resolved target address is present as a fetched instruction address in the fetched instruction table, flushing the at least one instruction fetched subsequent to the first instruction and prior to the second instruction in the instruction pipeline.

25. The method of claim 24
further comprising:
receiving a pipeline indicator stored in metadata in association with each fetched instruction address contained in the fetched instruction table; and
identifying the instruction pipeline in the instruction processing system containing the resolved target address;
wherein flushing the at least one instruction comprises flushing the at least one instruction fetched subsequent to the first instruction and prior to the second instruction in the identified instruction pipeline.

26. The method of claim 20, wherein flushing the at least one instruction in the instruction pipeline comprises:
comparing a next fetched instruction address in the instruction processing system to the resolved target address in an address buffer; and
flushing the next fetched instruction address in the instruction processing system responsive to the next fetched instruction address not matching the resolved target address in the address buffer.

27. The method of claim 20 further comprising, responsive to determining that the second instruction at the resolved target address is present in the instruction pipeline in the instruction processing system, recovering a speculative state of the processor that existed prior to prediction of the first instruction in the instruction processing system.

28. An instruction processing system for a processor comprising:
   one or more instruction pipelines each comprising an instruction fetch circuit configured to fetch instructions from an instruction memory into an instruction pipeline queue, and an execution circuit configured to execute the fetched instructions in the instruction pipeline queue; and
   a controller configured to:
      receive a precise interrupt comprising a resolved target address of a first instruction within an instruction pipeline of the one or more instruction pipelines in the instruction processing system, as a result of a hazard generated by executing the first instruction;
      response to receiving the precise interrupt, determine whether a second instruction at the resolved target address is present in the instruction pipeline of the one or more instruction pipelines in the instruction processing system; and
      responsive to determining that the second instruction at the resolved target address is present in the instruction pipeline, flush at least one instruction fetched subsequent to the first instruction and prior to the second instruction in the instruction pipeline.

29. The instruction processing system of claim 28 further comprising:
   a fetched instruction table configured to:
      store one or more received fetched instruction addresses for one or more instructions in the instruction pipeline;
      receive the resolved target address; and
      generate a hit/miss indicator indicating whether the received resolved target address is present as a fetched instruction address in the fetched instruction table,
   wherein the instruction fetch circuit is further configured to store fetched instruction addresses of the fetched instructions from the instruction memory in the fetched instruction table; and
   the controller configured to determine whether the second instruction at the resolved target address is present in the instruction pipeline in the instruction processing system by being configured to:
      provide the received resolved target address to the fetched instruction table;
      responsive to providing the received resolved target address to the fetched instruction table, receive the hit/miss indicator from the fetched instruction table; and
      responsive to the hit/miss indicator indicating that the resolved target address is present as a fetched instruction address in the fetched instruction table, flush the at least one instruction fetched subsequent to the first instruction and prior to the second instruction in the instruction pipeline.

30. The instruction processing system of claim 29 wherein:
   the fetched instruction table is further configured to store one or more pipeline indicators as metadata in association with the one or more received fetched instruction addresses indicating the instruction pipeline containing the second instruction at the fetched instruction address;
   the controller is further configured to receive a pipeline indicator from the fetched instruction table identifying the instruction pipeline containing the resolved target address; and
   the controller is configured to, responsive to the hit/miss indicator indicating that the resolved target address is present in the fetched instruction table, flush the at least one instruction fetched subsequent to the first instruction and prior to the second instruction in the instruction pipeline.

* * * * *